United States Patent [19]

Taig et al.

[11] 4,395,246
[45] Jul. 26, 1983

[54] UNIVERSAL JOINT

[75] Inventors: Alistair G. Taig; David D. Jordan, both of South Bend, Ind.

[73] Assignee: The Bendix Corporation, Southfield, Mich.

[21] Appl. No.: 184,491

[22] Filed: Sep. 5, 1980

[51] Int. Cl.³ ............................................. F16D 3/20
[52] U.S. Cl. .................................. 464/153; 464/110; 464/118
[58] Field of Search .............. 464/153, 147, 110, 118

[56] References Cited

U.S. PATENT DOCUMENTS

| | | | |
|---|---|---|---|
| 783,882 | 2/1905 | Mershon | 464/149 |
| 1,358,467 | 11/1920 | Robertson | 464/153 |
| 2,553,020 | 5/1951 | Urschel | 464/118 |
| 2,896,430 | 7/1959 | Olson | 464/153 |
| 2,953,001 | 9/1960 | Hufstader | 464/118 |

Primary Examiner—Ira S. Lazarus
Attorney, Agent, or Firm—Paul David Schoenle; Ken C. Decker

[57] ABSTRACT

A universal joint 10 includes an input assembly (12), an output assembly (14) and a housing (16) which is rotatable with the input and output assemblies. A pilot assembly (70) is carried within the housing (16) on the input assembly (12) and output assembly (14) to control the angle formed between the input assembly (12) and the output assembly (14).

5 Claims, 11 Drawing Figures

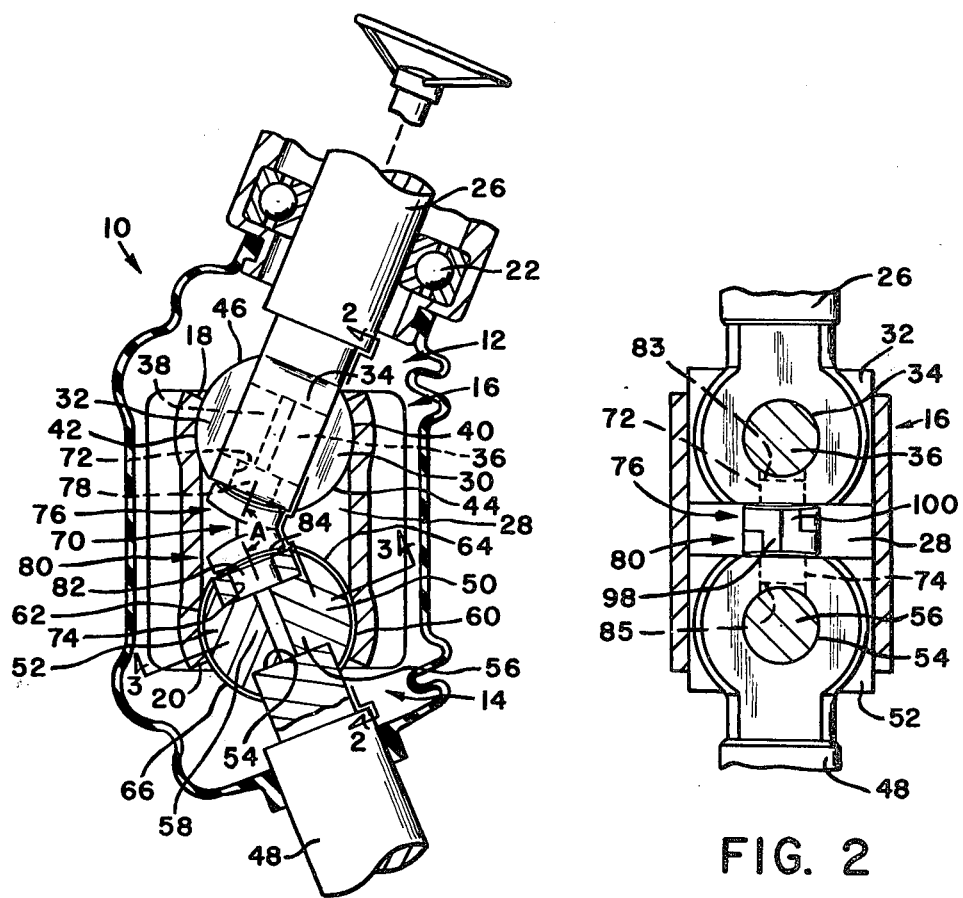
FIG. 1
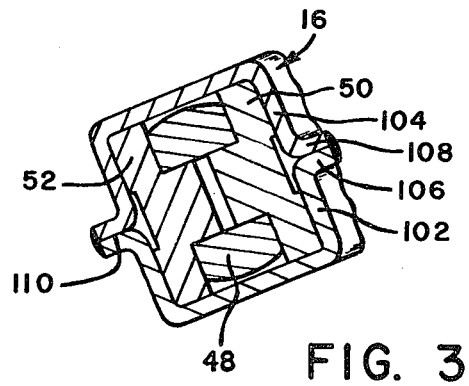
FIG. 2
FIG. 3

UNIVERSAL JOINT

The invention relates to a universal joint of the double Cardan type. With such a joint it is possible to attain constant velocity between an input shaft and an output shaft provided the relative angle formed with a housing is the same for each shaft.

In the prior art double Cardan joints a cross member is disposed between the input shaft and a yoke housing and also between the output shaft and the yoke housing. A pair of trunions coupled to the cross member are connected to yoke housing while another pair of trunions coupled to the cross member are connected to the input shaft to transmit rotation to the yoke housing. The trunions are formed by projections from the cross member so that the torque transmitted from the input shaft to the yoke housing is concentrated at these projections.

The prior art is illustrated in U.S. Pat. No. 4,075,871.

In U.S. patent application Ser. No. 54,365, filed July 2, 1979, a universal joint, which is not of the double Cardan type, provides for the transfer of torque between a pair of shafts via a pair of bearings which cooperate to form a cylindrical surface between the shafts. Because the torque is spread over a portion of the cylindrical surface the forces of rotation are less concentrated than with a standard trunion.

The present invention provides a double Cardan joint for the type of universal joint disclosed in U.S. patent application Ser. No. 54,365. In particular a two-part housing forms a pair of openings leading to a cavity. The pair of openings receive an input assembly and an output assembly, respectively, and the cavity wall forms a first pair of arcuate surfaces engageable with the input assembly and a second pair of arcuate surfaces engageable with the output assembly. The input and output assemblies define substantially cylindrical ends disposed in rotatable engagement with the first and second pair of arcuate surfaces, respectively. In order to maintain the housing at substantially the same angle relative to the input and output assemblies over a range of angles between these assemblies, a pilot assemly is disposed within the housing cavity. The pilot assembly enables the axes of the input and output assemblies to intersect at a point equidistant from the ends of the housing. A pair of openings on the input and output assemblies carry the pilot assembly within the cavity. The pilot assembly comprises a pair of substantially T-shaped elements, each with a projection extending into a recess on the other element to prevent rotation between the pair of elements.

The advantages offered by the invention are a simple construction for a constant velocity Cardan type universal joint which spreads the forces for transmitting torque from the input assembly to the housing and to the output assembly more uniformly over the radial dimension of the housing. Also, the pilot assembly is compactly disposed within the housing cavity and conveniently carried by the input and output assemblies in spaced relation to the housing.

Another advantage offered herein is that the pilot assembly substantially maintains equal angles between the housing and the input and output assemblies for a range of angles formed between the input and output assemblies. Consequently, the Cardan joint of the present invention provides constant velocity between the input and output assemblies at more than one angle.

One way of carrying out the invention is described in detail below with reference to the accompanying drawings which illustrate several embodiments.

FIG. 1 is a side view partially sectioned of a double Cardan joint in accordance with the invention;

FIG. 2 is a front view taken along 2—2 of FIG. 1;

FIG. 3 is a cross-sectional view taken along 3—3 of FIG. 1;

Figure 4:
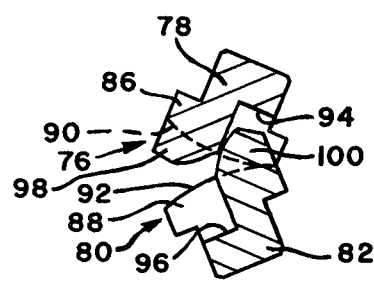
FIG. 4 is a view of the pilot assembly separated from the joint of FIG. 1.

The universal joint 10 in FIG. 1 includes an input assembly 12 and an output assembly 14. A housing 16 includes an opening 18 for receiving the input assembly 12 and an opening 20 for receiving the output assembly 14. The input assembly 12 and the output assembly 14 include axes which define an angle A therebetween. A bearing 22 journals the input assembly 12. As is well known in the art, if the housing 16 forms the same angular orientation relative to the input assembly as it does relative to the output assembly, the rotation of the input assembly will be the same as that of the output assembly.

Viewing FIGS. 1 and 2 together the input assembly 12 includes a shaft 26 extending into a cavity 28 within the housing 16, and a pair of bearing shoes 30 and 32. The shaft includes an opening 34 for receiving bosses 36 and 38 of bearing shoes 30 and 32, respectively. The wall of the housing 16 defining cavity 28 also forms a first pair of arcuate surfaces 40 and 42 which cooperate to form a circle in cross section. The bearing shoes 30 and 32 also form arcuate surfaces 44 and 46 which define a circle substantially equal in diameter to the circle of surfaces 40 and 42 when the bearing shoes 30 and 32 are attached to the end of shaft 26. In a similar manner, the output assembly 14 includes a shaft 48 extending into the cavity 28 and a pair of bearing shoes 50 and 52. The shaft 48 includes an opening 54 for receiving bosses 56 and 58 of bearing shoes 50 and 52, respectively. The wall of the housing 16 defining cavity 28 also form a second pair of arcuate surfaces 60 and 62 which cooperate to form a circle in cross section. The bearing shoes 50 and 52 also form arcuate surfaces 64 and 66 which substantially define a circle substantially equal in diameter to the circle of surfaces 60 and 62 when the bearing shoes 50 and 52 are attached to the end of shaft 48.

Figure 6:
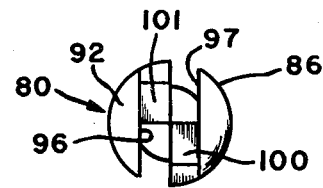
FIG. 6 is a top view of FIG. 5.
Figure 5:
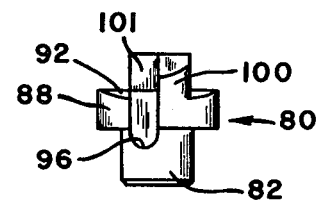
FIG. 5 is a side view of one of the elements comprising the pilot assembly of FIG. 4.

A pilot assembly 70 is carried by the input assembly 12 and the output assembly 14 within the housing cavity 28. The input shaft 26 terminates in an opening 72 and the output shaft 48 terminates in an opening 74. A substantially T-shaped first element 76 includes a leg 78 extending into opening 72 and a substantially T-shaped second element 80 includes a leg 82 extending into opening 74. Each leg forms an end 83 and 85 which is disposed adjacent the respective bosses 36, 38, and 56, 58. A wave washer 84 surrounding the leg 82 of element 80 opposes separation between the elements. The wave washer could also surround the leg 78 of element 76, or, in the alternative, a wave washer could be used with each element. In FIGS. 4-6 the elements 76 and 80 are shown separate from the universal joint. The element 76 forms a head 86 and the element 80 forms a head 88. Each head is circular in a transverse plane and forms an opposing outer surface 90 and 92 which is cylindrical. Each head also defines a pair of recesses, see FIG. 6, at 96, 97 and a pair of projections at 100, 101. Only one recess 94 and one projection 98 are shown for element 76 in FIG. 4. Because the first and second elements are identical, only one design is necessary. In the installed position of FIGS. 1 and 4, the projection 100 of element 80 is disposed within the recess 94 of element 76. In a similar manner, although not shown, the other projection of element 76 is disposed within the recess 96 of element 80.

The center of radius for the cylindrical surface 90 coincides with the center of radius for the bearing shoes 30 and 32, and the center of radius for the cylindrical surface 92 coincides with the center of radius for the bearing shoes 50 and 52. Consequently in FIG. 1, the angle A between the input and output assemblies can vary within the limits defined by the wall of openings 18 and 20. This angle can vary from 180° when the assemblies are coaxial to 120° when the assemblies are adjacent the walls of the openings 18 and 20. This variation between the input and output assemblies is possible without any change in the pilot assembly 70. Also, regardless the setting for angle A within the limits defined by the wall of the openings 18 and 20, the pilot assembly causes the axes of the input and output shafts 26 and 48, respectively, to intersect at a point which is equidistant from either opening 18 or opening 20. In the alternative, the point of intersection for the axes of each shaft, 26 and 28, is equidistant from the centers for each pair of bearing shoes 30, 32 and 50, 52.

In FIG. 3 the housing 16 is formed from a pair of matching stampings 102 and 104. Each stamping is substantially U-shaped with outwardly extending flanges 106 and 108 formed at the open end thereof. The flanges are either welded together or bolted by suitable means after the parts of the input and output assemblies and the pilot assembly are disposed between the stampings.

When the input assembly 12 is imparting rotation to the housing 16 and the output assembly 14, the pilot assembly 70 remains stationary within the cavity 28. Consequently, the input assembly rotatably engages the element 76 and the output assembly rotatably engages the element 80. Also, the input assembly and output assembly rotate relative to the housing 16 in a first plane parallel to the radii of curvature for the arcuate surfaces 44, 46 and 64, 66. The rotation of the input and output assemblies follows from FIG. 1 wherein the rotation of the universal joint 10 through 180 degrees will move bearing shoes 30 and 50 to the position illustrated for bearing shoes 32 and 52. Also, the bearing shoes 32 and 52 will move to the position illustrated for bearing shoes 30 and 50. Therefore, the outer surfaces 44 and 46 will slidably engage the respective housing surfaces 40 and 42 to rotate counterclockwise relative to the housing. Conversely, the outer surfaces 64 and 66 will slidably engage the respective housing surfaces 60 and 62 to rotate clockwise relative to the housing.

Also, when the input assembly is imparting rotation to the housing 16 and the output assembly 14, the pilot assembly 70 is carrying side forces to prevent the housing 16 from moving to a position where the angles formed with each shaft 26 and 48 are different.

Figure 7:
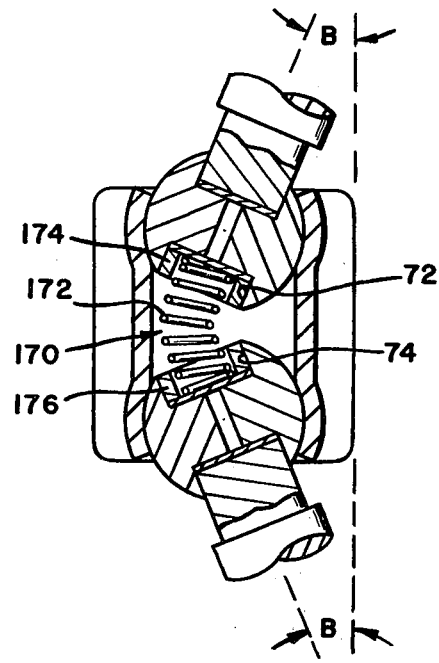
FIG. 7 is a side view similar to FIG. 1 showing a first alternative embodiment of a double Cardan joint in accordance with the invention.
Figure 5A:
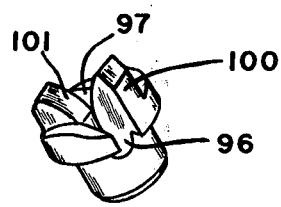
FIG. 5a is a perspective view of the element shown in FIG. 5.

Turning to FIG. 7, the first alternative embodiment is substantially identical to the universal joint 10 of FIG. 1 except for the pilot assembly 170. The pilot assembly 170 comprises a single spring 172 which is pressed into the openings 72 and 74 to rotate with the input and output assemblies. As shown in FIG. 7, each opening 72 and 74 also receives a respective sleeve or collar 174 and 176 to rigidly connect the spring to the input and output assemblies. This pilot assembly also differs from the pilot assembly 70 in the rotation of the spring 170 with the input and output assemblies, whereas the pilot assembly is stationary in the universal joint 10.

Figure 8:
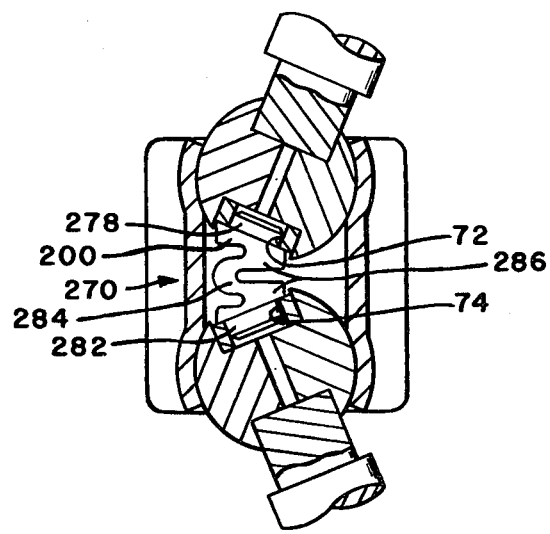
FIG. 8 is a side view similar to FIG. 1 showing a second alternative embodiment of a double Cardan joint in accordance with the invention.

In FIG. 8 the second alternative embodiment utilizes a plastic plug 200 for a pilot assembly 270. The plug 200 integrally forms a pair of legs 278 and 282 for extension into the openings 72 and 74 of input assembly 12 and output assembly 14, respectively. The plug also integrally forms a center resilient section 284 defining a substantially U-shaped plastic clip 286 integrally extending from the legs 278 and 282. The legs extend from the center resilient section at a predetermined angle to control the angular orientation of the input assembly 12 relative to the output assembly 14. In this embodiment, the pilot assembly 270 remains stationary within the housing cavity when the housing rotates with the input and output assemblies.

Figure 9:
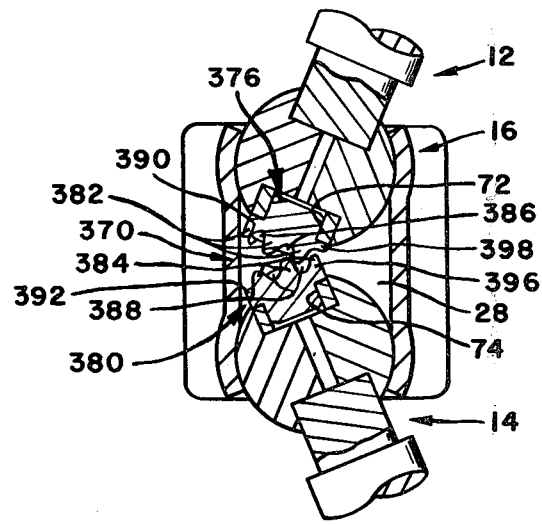
FIG. 9 is a side view similar to FIG. 1 showing a third alternative embodiment of a double Cardan joint in accordance with the invention.
Figure 10:
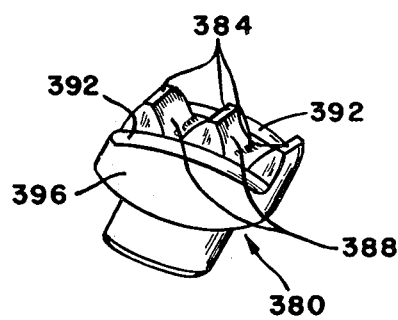
FIG. 10 is a perspective view of one part of the pilot assembly used in FIG. 9.

Lastly, in the third embodiment of FIGS. 9 and 10 the pilot assembly 370 is similar to the pilot assembly 70 except that the elements 376 and 380 define a plurality of projections at 382 and 384 with intermittent grooves between the projections at 386 and 388. The projections extend outwardly from the respective cylindrical outer surfaces 390 and 392 while the grooves are recessed from the respective cylindrical outer surfaces 390 and 392. Also the projections and recesses are confined to a predetermined uniform width across the heads 394 and 396 of respective elements 376 and 380. In this third embodiment, the pilot assembly remains stationary within the housing cavity 28 when the housing is rotating with the input and output assemblies.

Although the housing 16 in FIG. 3 is formed from a pair of stampings with an interface 110 extending in a plane radially disposed relative to the cylinders of bearing shoes 30, 32 and 50, 52, it is within the scope of the invention to form the housing 16 by providing a pair of stampings with an interface extending in a plane axially disposed relative to the cylinders.

Furthermore, it is contemplated that one skilled in the art could make many modifications and/or changes to the invention as described herein without deviation from the essence thereof. As such these modifications and/or changes are intended to fall within the scope of the appended claims.

We claim:

1. In a universal joint, a housing having a pair of openings for receiving an input assembly with an input shaft and an output assembly with an output shaft, said input assembly being rotatable to impart rotation to said housing and to said output assembly, a pilot assembly disposed within said housing and cooperating with said input and output assemblies to substantially maintain equal angles between said assemblies and said housing, characterized by said input and output assemblies terminating in cylindrical ends having their longitudinal axis extending substantially normal to said input and output shafts, and said housing defining a first pair of arcuate surfaces engageable with said input cylindrical end and a second pair of arcuate surfaces engageable with said output cylindrical end, said housing rotating with said input and output assemblies to provide for sliding engagement between said cylindrical ends and their respective housing arcuate surfaces when said input assembly is imparting rotation to said housing and said output assembly, and said cylindrical ends remain in spaced relation so that the rotation of said input cylindrical end is transmitted to said output cylindrical end via said housing.

2. The universal joint of claim 1 in which said pilot assembly cooperates with at least one of said input and output assemblies to carry resilient means within said housing.

3. The universal joint of claim 1 in which said input and output assemblies each comprise a shaft terminating in an eyelet defining an opening and a pair of bearing shoes carried within said opening slidably engage said housing.

4. In a universal joint, the combination of a housing defining a pair of openings leading to a cavity for receiving an input shaft and an output shaft, the input shaft being rotatable to impart rotation to the housing which, in turn, imparts rotation to the output shaft, a pilot cooperating with the input shaft and the output shaft to substantially maintain the shafts at equal angles relative to the housing during rotation of the shafts and housing, a first bearing associated with the input shaft and rotatably engaging the wall of the housing cavity, a second bearing associated with the output shaft and rotatably engaging the wall of the housing cavity in spaced relation to said first bearing, with said input shaft and said output shaft to define cyliners disposed within said housing cavity, said cylinders having longitudinal axis which are parallel and offset, said cylinders also extending partially outside of said housing, said cylinders and shafts pivoting relative to said housing in a first plane and said shafts being adapted to pivot relative to said cylinders in a second plane substantially perpendicular to said first plane.

5. In a universal joint having an input assembly and an output assembly which are connected to a housing, the input assembly being rotatable to rotate the housing and output assembly, a pilot assembly disposed within the housing in engagement with the input and output assemblies and cooperating with the latter to substantially maintain equal angles between the assemblies and housing, characterized by each of said input and output assemblies cooperating with said housing to define a pair of substantially arcuate interfaces therebetween which permit sliding movement in a first plane between said housing and said input and output assemblies, said arcuate interfaces also prohibiting rotation between said housing and said input and output assemblies, whereby torque is transmitted from said input assembly to said output assembly via said housing interfaces, said pilot assembly comprising a pair of substantially T-shaped elments, each of said elements including a projection and a recess which cooperate to prevent rotation between said elements, each of said elements defining an arcuate surface engageable with each other and said pilot assembly including resilient means biasing said elements in contact with each other.

* * * * *